Jan. 28, 1964  B. A. SARAFINAS  3,119,299
FASTENING DEVICE
Filed May 31, 1960
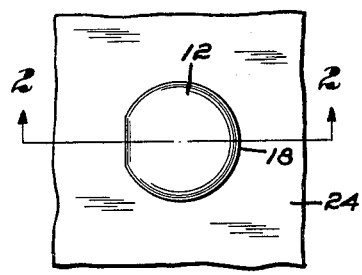
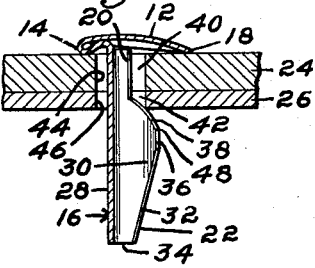
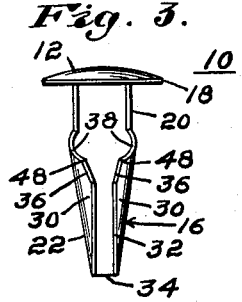
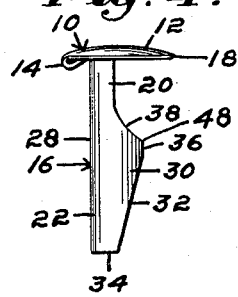
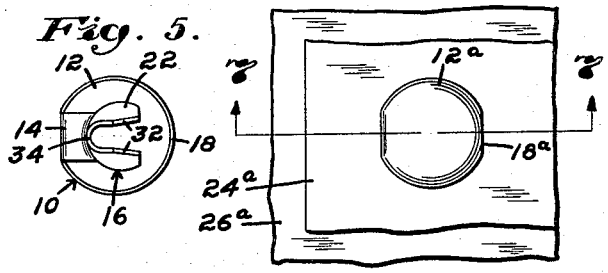
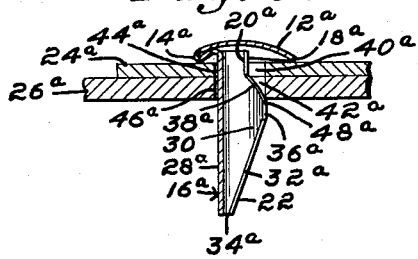
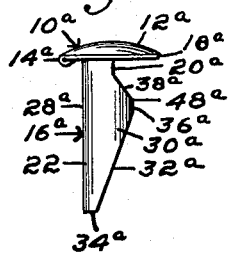
Inventor
Bruno A. Sarafinas,
by Walter P. Jones
Atty.

United States Patent Office 3,119,299
Patented Jan. 28, 1964

3,119,299
FASTENING DEVICE
Bruno A. Sarafinas, Essex County, Mass., assignor to United-Carr Fastener Corporation, Cambridge, Mass., a corporation of Delaware
Filed May 31, 1960, Ser. No. 32,883
1 Claim. (Cl. 85—5)

This invention relates to a fastening member and in particular to a fastener member adapted for axial insertion to retain two or more parts in abutting relationship.

An object of this invention is to provide a fastening member which may be pushed into engagement with the wall of the apertures of two or more parts to retain the said parts in abutting relationship.

A further object of the invention is to provide a fastening member to engage the edges of apertures of two or more parts wherein said fastening member is self-retaining.

A still further object of the invention is to provide a fastener for engagement with the edges of apertures formed in two or more parts whereby the said member is capable of engaging the edges of apertures of parts having varying thicknesses.

Other objects of the invention will, in part, be obvious, and will, in part, appear hereinafter.

In the drawing:

FIG. 1 is a top plan view of the fastener member engaged with two parts;

FIG. 2 is a section taken on the line 2—2 of FIG. 1;

FIG. 3 is a front elevation of the fastener member;

FIG. 4 is a side elevation of the fastener member;

FIG. 5 is a bottom plan view of the fastener member;

FIG. 6 is a top plan view of a modification of the member engaged with a pair of apertured parts;

FIG. 7 is a section taken on line 7—7 of FIG. 6; and

FIG. 8 is a side elevation of the modified form of the member shown in FIG. 6.

Referring to the drawing, there is illustrated a fastener member 10 comprising a flange portion herein shown as an arcuate cap 12, a connector element 14 and a tubular split shank 16, the said cap 12 is curved arcuately downward from its center point toward the periphery 18 so as to present a concave surface with respect to the shank 16. The shank 16 as illustrated in FIGS. 3 and 5 is an elongated semi-cylinder having a neck portion 20 and a stem portion 22. The said neck portion 20 is in integral relation with the connector element 14 and the stem portion 22. The said neck portion 20 defines, in cross section, an axial continuation of a semi-circle and is in the illustrated fastener slightly less in length than the thickness of the apertured parts 24 and 26. The said stem portion 22 comprises a spine element 28 and a pair of leaves 30 integral with said spine portion and in opposed relationship to each other. The said stem portion 22 defines, in cross section, an axial continuation of a truncated cone and the axis of said stem portion 22, neck portion 20 and cap 12 are coincident with each other. The periphery 18 of the cap 12 extends beyond the area defined by the neck portion 20 or the stem portion 22. The leaves 30, as best illustrated in FIG. 3, each have a tapering lead edge 32 which terminates at the terminal end 34 of the stem portion 22. At the high point of each of the leaves 30 and in integral angular relationship with the lead edge 32 is a flat edge portion 36, the said flat edge portion 36 is in integral angular relationship with the arcuate land 38 completing the edge of the leaf 30.

The fastener member 10 is engaged with a pair of parts 24 and 26 having openings 40 and 42 formed therein, and the opening 40 of the upper part, as shown in FIG. 2, has a wall 44 and the opening 42 of the lower part has an engaging wall 46. The terminal end 34 of the stem portion 22 is passed between the wall 44 of the opening 40 and the wall 46 of the opening 42 until the spine element 28 of the stem portion 22 and the flat edge portion 36 engage the said wall 44. This places a force which tends to bring the lead edge 32 and the flat edge portion 36 of each of said leaves 30 toward each other, thus compressing the stem portion 22 and placing it under tension. Since the flat edge portions 36 diverge away from the axis of the stem portion 22, as best illustrated in FIG. 3, the tension is increased as the fastener is pushed further between the wall 44 and the engaging wall 46. This tension continues until the fastener is pushed to the high point 48 which occurs at the line of meeting of the flat edge portion 36 and the land 38. The land 38 falls partially away toward the neck portion 20 which is considerably more shallow than the stem portion 22 so that when the force has pushed the lands 38 to the side of the part 26 farthest from the cap 12, a part of the land 38 will engage a portion of the part 26 adjacent the engaging wall 46 and the spine element 28 would have been moved away from its original abutting relationship with the wall 44 and the engaging wall 46 as best illustrated in FIG. 2. In other words, there is a tendency as the fastener member is progressively engaged with the parts to fold in the leaves 30 toward each other and then when the high point 48 has passed to have the leaves recover their original configuration, and, in effect, snap under the lower part 26. The leaves 30 press on the greatest diameter of the diametral line and as the member is pushed in, the spine moves away from the wall 44 and the engaging wall 46 so that the whole fastener member 10 is thrown forward putting the terminal end 34 of the stem portion 22 beyond the wall 44 and the engaging wall 46 this tends to bring the axis of the neck portion 20 toward the center diameter.

In the variation of the fastener 10 shown in FIGS. 6 through 8 the same numerals have been used to indicate the parts illustrated in FIGS. 1 through 5, and a suffix *a* has been added to each of the numbers to differentiate the variant from the original fastener. The chief difference between the two fasteners is that: the neck portion 20*a* when engaged with the apertured parts 24 and 26 is so constructed that its terminal edges lie on a plane beyond the axis of the openings 40*a* and 42*a* when the spine elements 28*a* abuts the wall 44 and the engaging wall 46*a* of the said openings 40*a* and 42*a*. The diameter of the openings 40*a* and 42*a* are smaller than the outer neck 20*a* and the diameter of the truncated cone formed by the leafs 30*a* is also of greater diameter than the openings 40*a* and 42*a*. Therefore, on engagement with the walls 44*a* and 46*a*, the major portion of the fastener is constricted when the fastener has been pressed to its finally engaged position with the supports 24*a* and 26*a*. Tension is released on the flat edge portiton 36*a* after passing the high point 48*a*, placing the high point 48*a* in abutting relationship with the portion of the part 26*a* adjacent the opening 42*a*.

Please note that one of the basic differences between the fastener illustratted in FIGS. 1 through 5 and the variation illustrated in FIGS. 6 through 8 is that the spine element 28*a* doesn't move away from the edges 44*a* and 46*a* of the openings 40*a* and 42*a* as it does in the fastener numbered 10. In both the fasteners 10 and 10*a* there is a definite locking feature which goes beyond the usual friction engagement found in many similar fasteners and the truncated cone defined by the spine elements 28*a* and the leafs 30 is, the applicant contends, unique with the fasteners disclosed herein giving them very strong engaging characteristics. Applicant has also found that the flat edge portion 36*a* is better for the purposes than having the portion at an angle in relation to the spine element 28*a*. This fastener in its original form and its variation can be manufactured from metallic as well as resins and molding compounds.

Since certain other obvious modifications may be made in this device without departing from the scope of the invention, it is intended that all matter contained herein be interpreted in an illustrative and not in a limiting sense.

I claim:

A self-retaining push-in tack comprising a cap, said cap being curved arcuately downward from its center, a tubular split shank and a hook-shaped connector element integrally joining said cap and said shank, said shank having an arcuate neck portion having forward edges, said neck portion defining in cross-section at least a semi-circle, and a stem portion, said stem portion having a spine portion integral with a pair of tapered resilient leaf elements, said leaf elements being convexly curved, each of said leaf elements spaced from each other in an opposed relationship and each having a free forward edge, each of said forward edges comprising a lead edge diverging from and in acute angular relation with the leading end of said spine portion, said spine portion being parallel to the longitudinal axis of said tack, a straight flatted edge portion in integral angular relation with said lead edge, said flat edge portion being substantially parallel to said spine portion and being spaced farther from said spine than the forward edges of said neck portion, and an arcuate land portion integral with said flat edge portion and with said neck portion, said arcuate land portion of each leaf element being curved both downwardly from said neck portion and inwardly toward one another, the intersection of said arcuate land portion and said flat edge portion defining a corner, said flat edge portions in acute angular relationship with each other and said arcuate land portions directed away from the plane of said spine portion.

References Cited in the file of this patent

UNITED STATES PATENTS

| | | |
|---|---|---|
| 2,110,959 | Lombard | Mar. 15, 1938 |
| 2,173,198 | Churchill | Sept. 19, 1939 |
| 2,438,499 | Hartman | Mar. 30, 1948 |
| 2,451,591 | Tinnerman et al. | Oct. 19, 1948 |